United States Patent
Hyodo et al.

(10) Patent No.: US 7,388,312 B2
(45) Date of Patent: Jun. 17, 2008

(54) POWER TOOL

(75) Inventors: Koki Hyodo, Anjo (JP); Nobuyasu Furui, Anjo (JP); Kenichi Ota, Anjo (JP)

(73) Assignee: Makita Corporation, Anjo (JP)

( * ) Notice: Subject to any disclaimer, the term of this patent is extended or adjusted under 35 U.S.C. 154(b) by 12 days.

(21) Appl. No.: 11/250,368

(22) Filed: Oct. 17, 2005

(65) Prior Publication Data

US 2006/0087193 A1 Apr. 27, 2006

(30) Foreign Application Priority Data

Oct. 21, 2004 (JP) ............................. 2004-307477

(51) Int. Cl.
*H02K 7/14* (2006.01)
(52) U.S. Cl. .................... 310/198; 310/184; 310/130
(58) Field of Classification Search ................ 310/198, 310/184, 50, 310
See application file for complete search history.

(56) References Cited

U.S. PATENT DOCUMENTS

| | | | |
|---|---|---|---|
| 3,525,912 A | 8/1970 | Wallin | |
| 3,733,506 A | 5/1973 | Jaffe et al. | |
| 4,876,472 A | 10/1989 | Shiraki et al. | |
| 6,566,782 B1 * | 5/2003 | Wang | 310/225 |
| 6,683,396 B2 * | 1/2004 | Ishida et al. | 310/50 |
| 2003/0159271 A1 | 8/2003 | Wang | |

FOREIGN PATENT DOCUMENTS

| | | |
|---|---|---|
| EP | 1 164 685 A2 | 12/2001 |
| JP | A 2-184246 | 7/1990 |
| JP | A 2003-092866 | 3/2003 |

* cited by examiner

*Primary Examiner*—Dang D Le
(74) *Attorney, Agent, or Firm*—Oliff & Berridge, PLC

(57) ABSTRACT

It is an object of the invention to provide an improved technique for controlling the output characteristic of a motor. Representative power tool includes a tool bit and a motor. The motor drives the tool bit and includes an armature, a coordinator, a plurality of segments and a plurality of armature windings. The armature has a plurality of slots. The communicator rotates together with the armature. Plurality of segments is provided on the communicator. Respective armature windings are connected at the both ends of the segments. Each of the armature windings is defined by coils that are wound between respective pairs of the slots of the armature. Each of the armature windings is formed by at least two coils connected in series. At least one of the coils defining the armature winding has a different number of turns of a wire wound between the associated slots from the other coils in the same armature winding. On the same time, the total number of turns of the coils of each of the armature windings is the same. Thus, as a result, the magnetic field around each of the armature windings can be kept substantially the same while providing fine adjustment of the numbers of turns in the armature windings.

3 Claims, 4 Drawing Sheets

POWER TOOL

BACKGROUND OF THE INVENTION

1. Field of the Invention

The present invention relates to a power tool with a driving motor and more particularly, to a technique for controlling the output characteristic of the motor by adjusting the number of turns of a wire of a coil forming an armature winding.

2. Description of the Related Art

Generally, an armature of a DC motor has a plurality of slots. Coils are formed by winding a wire a number of turns between the slots. The coils are connected to associated segments of a communicator and define armature windings. The driving current of the motor is supplied to the coil of the armature windings via the segments and brushes which are in sliding contact with the segments. Upon such supply of current, a magnetic field is generated around the coils and interacts with the field generated by a stator which is fixedly disposed around the armature.

In the known DC motor, the same number of brushes as the number of poles of the stator is provided. However, the resistance loss caused by friction between the commutator and the brushes during the rotation of the armature may increase with increase in the number of brushes. Further, the number of parts increases as the number of brushes increases. In this connection, Japanese non-examined laid-open Patent Publication No. 2-184246 discloses a motor which can be driven while having a four-pole stator and two brushes by short-circuiting diametrically opposed segments of a commutator such that the coils connected to the opposed segments are short-circuited, All of the coils that form armature windings consist of the same number of turns of a wire wound between slots, which number is selected according to a desired output characteristic of a motor, i.e. a desired torque or rotation speed. If a different number of turns is selected for each coil, the magnetic field generated around each of the coils when the driving current passes through the coils will wary in strength, because each of the coils that form armature windings is connected to associated segments. As a result, the commutator is deteriorated and suffers degradation in performance

SUMMARY OF THE INVENTION

Accordingly, it is an object of the invention to provide an improved technique for controlling the output characteristic of a motor by adjusting the number of turns of a wire of a coil that defines the armature winding.

This object is achieved by providing a power tool bit and a motor. The tool bit performs a predetermined operation to a work piece. The motor drives the tool bit and includes an armature, a commutator, a plurality of segments and a plurality of armature windings. The armature has a plurality of slots. The commutator rotates together with the armature. Plurality of segments is provided on the commutator. Respective armature windings are connected at the both ends to the segments. Each of the armature windings is defined by coils that are wound between respective pairs of the slots of the armature. Each of the armature windings is formed by at least two coils connected in series. At least one of the coils defining the armature windings has a different number of turns of a wire wound between the associated slots from the other coils in the same armature winding. On the same time, the total number of turns of the coils of each of the armature windings is the same.

According to the invention, because of the total number of turns of coils defining each of the armature windings is the same, the magnetic field around each of the armature windings can be kept substantially the same and, as a result, the commutator is not easily deteriorated and can readily keep high commutating performance. On the other hand, at the same time, fine adjustment of the numbers of turns in the armature windings can be easily made by optimizing turns of respective coils in each armature winding without changing the strength the magnetic field around the armature winding.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and methods steps in conjunction, will now be described in detail with reference to the drawings. The detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the present invention will now be described with reference to FIGS. 1 to 4.

An electric (battery-powered) impact driver 100 will be described as a representative example of the "power tool" of the present invention. The impact driver 100 has a driver motor provided as a four-pole two-brush DC motor. Within the motor, ten segments are provided on a commutator and ten slots are formed in a armature. Diametrically opposed segments are short-circuited by means of a wire of coils that are wound between slots.

Figure 1:
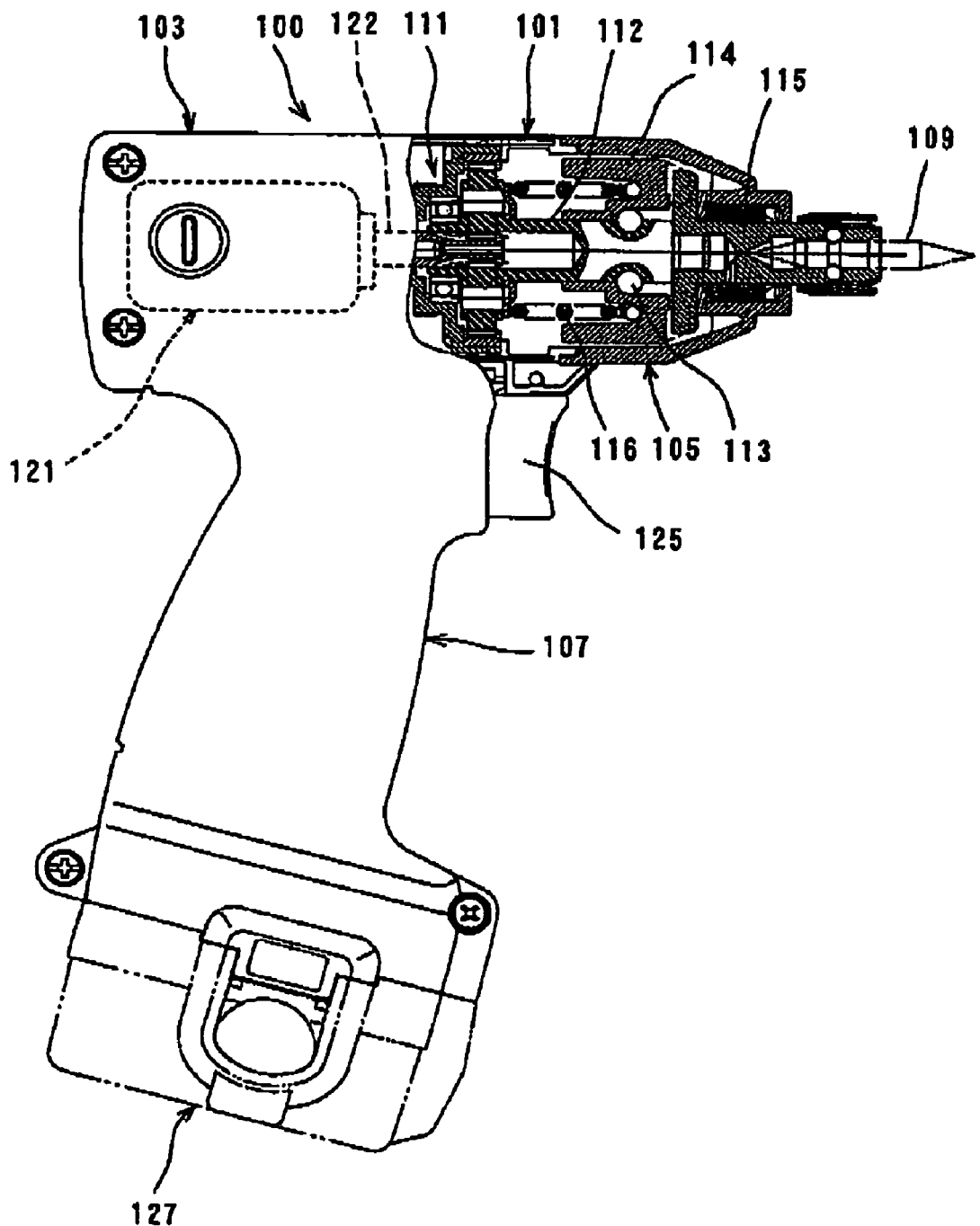
FIG. 1 shows an entire impact driver 100 as an example of a power tool of the present invention.
Figure 2:
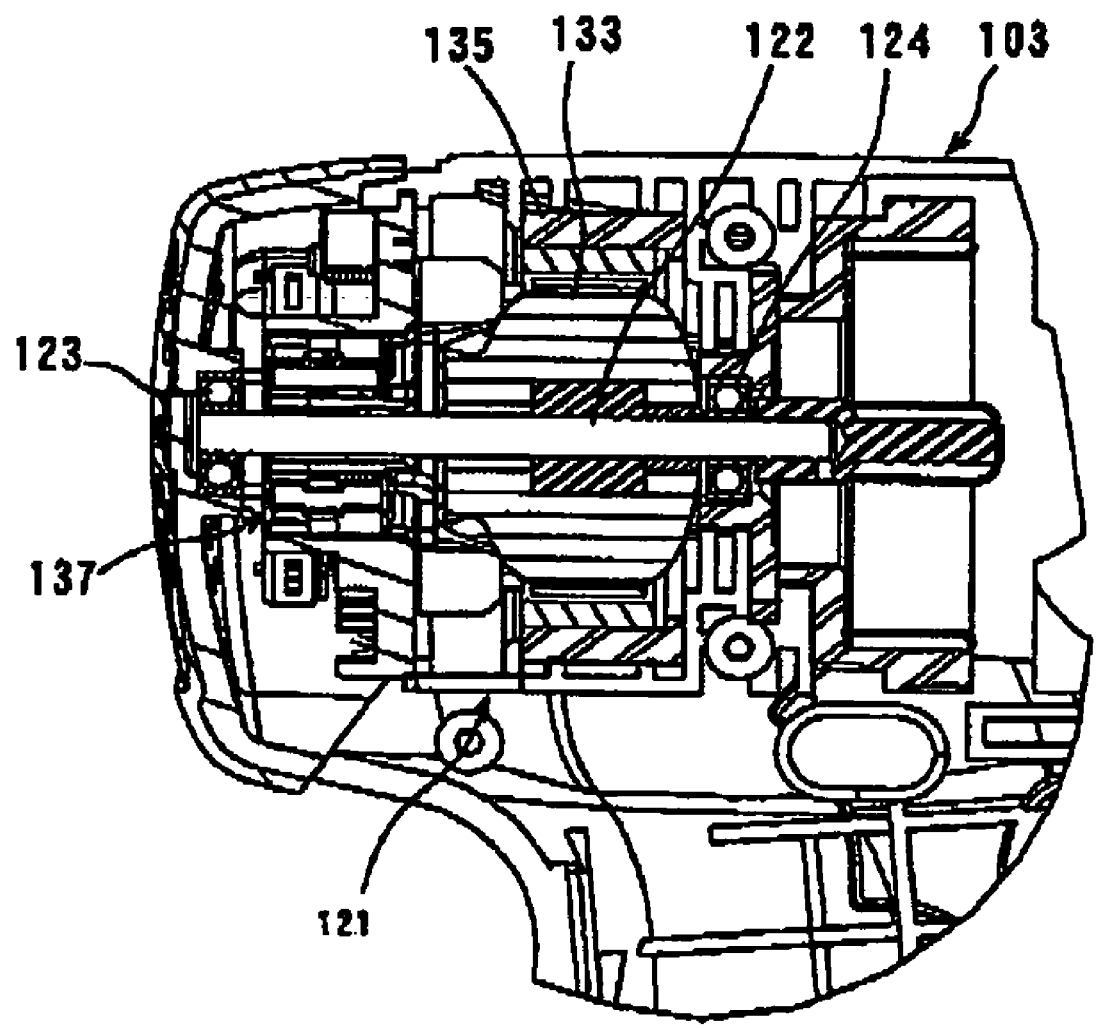
FIG. 2 is a sectional view showing a driving motor 121 of the impact driver 100.
Figure 3:
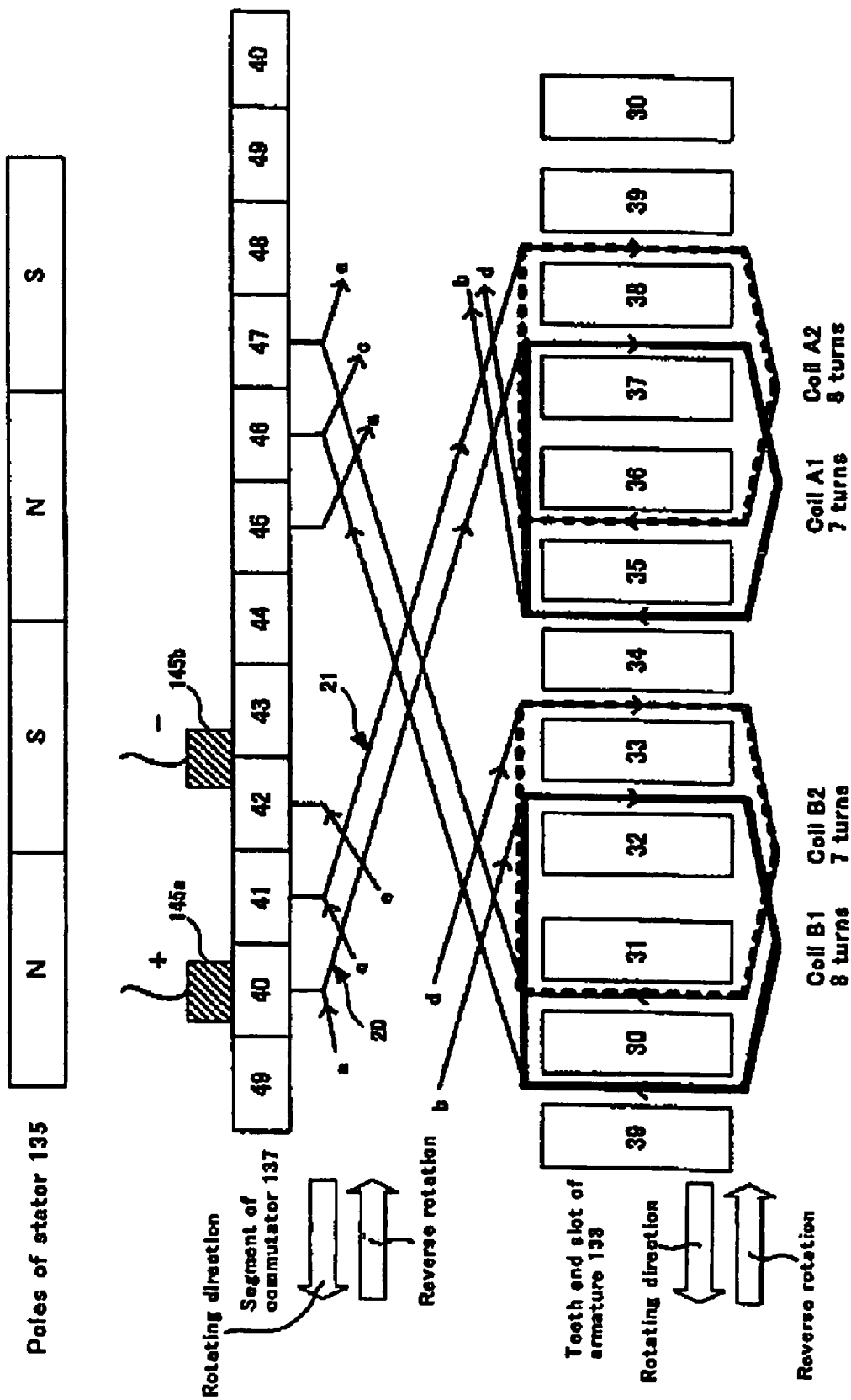
FIG. 3 shows an example of an armature winding that is formed by coils wound between the slots of an armature 133.
Figure 4:
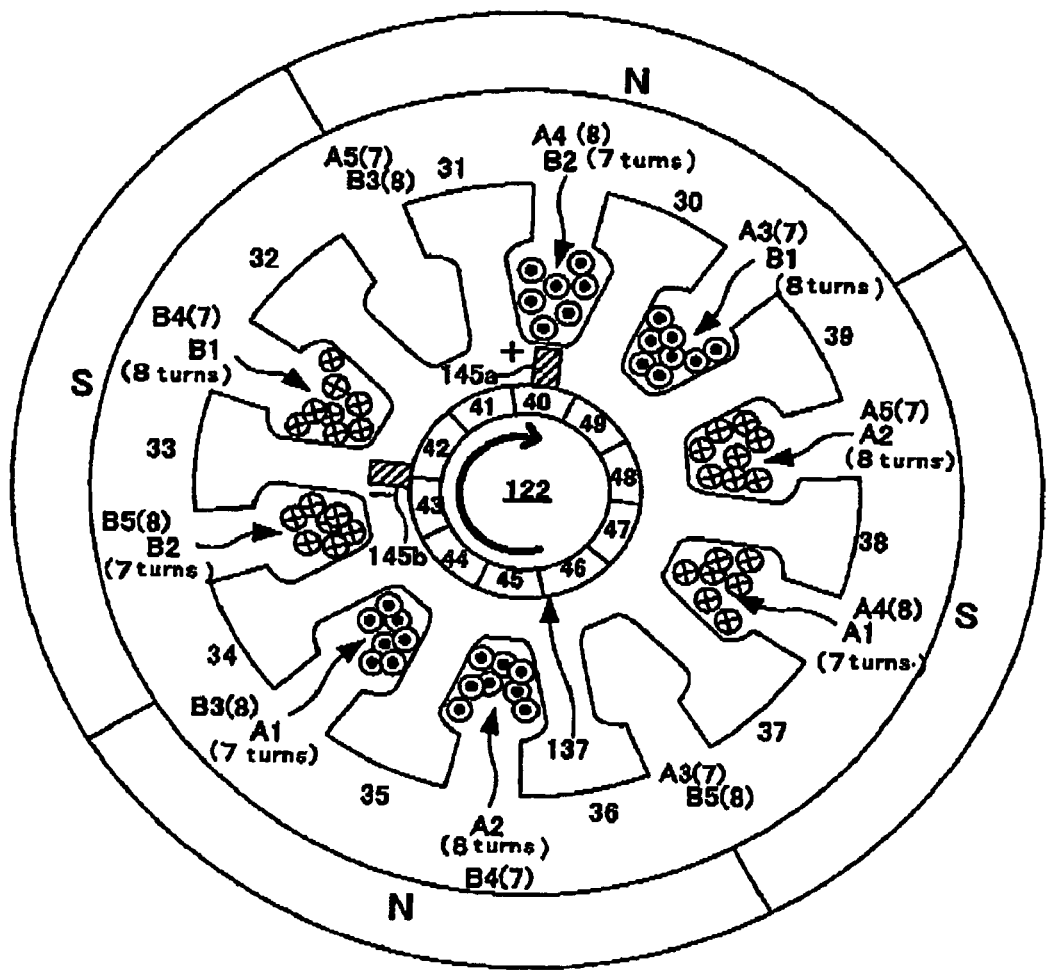
FIG. 4 is a sectional view of the armature 133 with armature windings 20, 21 wound between the slots.

FIG. 1 is a side view, partly in section, schematically showing the entire impact driver 100. FIG. 2 is a sectional view showing the structure of the driving motor of the impact driver 100. FIG. 3 shows an example of the armature winding that is formed by coils wound between slots of the armature of the motor shown in FIG. 2. FIG. 4 is a sectional view of the armature with the armature windings wound between the slots.

As shown in FIG. 1, the impact driver 100 according to the representative embodiment includes a body 101 and a driver bit 109. The driver bit 109 is detachably coupled to the tip end region of the body 101 and adapted to tighten various types of screws. The driver bit 109 is a feature that corresponds to the "tool bit" according to the present invention. The body 101 includes a motor housing 103, a gear housing 105 and a handgrip 107. The motor housing 103 houses a driving motor 121. A trigger 125 is mounted on the handgrip 107, and depressing the trigger 125 turns on a power switch of the driving motor 121.

The gear housing 105 houses a speed reducing mechanism 111, a spindle 112, a hammer 114 and an anvil 115. The speed reducing mechanism 111 mainly includes a planetary gear and appropriately reduces the speed of rotation of an output shaft 122 of the driving motor 121. The spindle 112 is rotated by the speed reducing mechanism 111. The rotation of the spindle 112 causes the anvil 115 to rotate. The hammer 114 can move with respect to the spindle 112 in its longitudinal direction and is urged toward the anvil 115 by a compression spring 116. An end of the anvil 115 protrudes from the end of the gear housing 105, and the driver bit 109 is detachably coupled to the protruded end of the anvil 115.

When the driving motor 121 is driven for a screw tightening operation and the screw tightening torque of the driver bit 109 is low, the spindle 112 and the hammer 114 rotate together. Under such low-load conditions, the hammer 114 is held in engagement with an anvil 115 by the biasing force of the compression spring 116. Thus, the anvil 115 also rotates together with the hammer 114, so that the driver bit 109 performs a screw-tightening operation.

When the tightening torque is increased to a predetermined high level, the hammer 114 moves away from the anvil 115 against the biasing force of the compression spring 116. Thereafter, the hammer 114 engages with the anvil 115 as carrying impulsive rotating torque by the biasing force of the compression spring 116. Thus, high tightening torque is produced on the driver bit 109 via the anvil 115. The operating principle of the impact driver 100 itself is known and thus will not be described in detail.

The construction of the driving motor 121 will now be described in brief with reference to FIG. 2. The driving motor 121 in this embodiment is a four-pole DC motor powered by the battery 127. The driving motor 121 includes an output shaft 122, an armature 133, a stator 135, a commutator 137 and two brushes 145a, 145b (see FIGS. 3 and 4). The armature 133 rotates together with the output shaft 122, and coils that form armature windings are wound on the armature 133. The stator 135 is secured to the motor housing 103 and generates a magnetic field around the armature 133. The commutator 137 is fitted onto the output shaft 122 near its end (which is remote from the speed reducing mechanism 111). The two brushes 145a, 145b supply driving current to the armature windings on the armature 133 in sliding contact with a plurality of segments provided on the outside surface of the commutator 137.

One end (the rear end, or the left end as viewed in FIG. 2) of the output shaft 122 is rotatably supported on the motor housing 103 via a bearing 123. The other end (on the side of the speed reducing mechanism, or the right side as viewed in FIG. 2) of the output shaft 122 is rotatably supported on the gear housing 105 via a bearing 124. The output shaft 122, the armature 133 and the commutator 137 form a rotor.

When the power to the driving motor 121 having the above construction is turned on, driving current is supplied to the armature windings of the armature 133 within the magnetic field of the stator 135, and the armature 133 and the output shaft 122 are caused to rotated together. At this time, the commutator 137 and the brushes 145a, 145b appropriately change the direction of current that passes through the armature windings such that the armature 133 and the output shaft 122 can continuously rotate in a predetermined direction.

The construction of the driving motor 121 will now be described in more detail with reference to FIGS. 3 and 4.

First, the armature 133, the stator 135 and the commutator 137 will be explained with reference to FIG. 4. A ring magnet is provided on the inside surface of the stator 135 which faces the armature 133. The ring magnet is polarized such that it is divided into four regions and each pair of the two opposed regions have the same polarity (the north pole or the south pole) on its inside surface. The armature 133 has ten radially extending teeth 30-39 and is thus shaped liked a gear in section. Ten slots are formed between the adjacent teeth 30-39 and a wire of coils that form an armature winding is wound between the slots.

The commutator 137 is fitted onto the end of the output shaft 122 that is inserted through the center of the armature 133. Ten segments 40-49 are formed on the outside surface of the commutator 137 and the brushes 145a, 145b come in sliding contact with the segments. Adjacent segments are insulated from each other. Further, each of the segments is connected to the associated armature winding or other segment by wiring (see FIG. 3).

The brushes 145a, 145b are spaced 90° apart from each other in the direction of sliding contact with the commutator 137.

Next, the construction of an armature winding that is formed by a coil wound between the slots will be explained in detail with reference to FIG. 3, taking armature windings 20, 21 as an example. Arrows shown in the drawing indicate the direction of winding the coil wire (and not the direction of flow of the driving current).

A wire is connected to the segment 40 is inserted through a slot between the teeth 37 and 38 and passed over the teeth 37, 36, 35 and then inserted through a slot between the teeth 35 and 34. Thus, the wire is wound one turn around the teeth 37, 36, 35 between these slots. A coil A1 is formed by thus winding the wire seven turns between these slots. Thereafter, the wire is inserted through a slot between the teeth 30 and 39. Thus, the wire is wound one turn around the teeth 32, 31, 30 between these slots. A coil B1 is formed by thus winding the wire eight turns between these slots. Then the wire is connected to the segment 46. In this manner, the coils A1 and B1 are connected in series and form the armature winding 20.

The segment 46 is connected to the segment 41 (as shown by arrow c) and short-circuited. The wire connected to the segment 46 is insert through a slot between the teeth 38 and 39 and passed over the teeth 38, 37, 36 and then inserted through a slot between the teeth 36 and 35. Thus, the wire is wound one turn around the teeth 38, 37, 36 between these slots. A coil A2 is formed by thus winding the wire eight turns between these slots. Thereafter, the wire is inserted through a slot between the teeth 33 and 34 (as shown by arrow d) and passed over the teeth 33, 32, 31 and then inserted through a slot between the teeth 31 and 30. Thus, the wire is wound one turn around the teeth 33, 32, 31 between these slots. A coil B2 is formed by thus winding the wire seven turns between these slots. Then the wire is connected to the segment 47. In this manner, the coils A2 and B2 are connected in series and from the armature winding 21.

In a similar manner, armature windings 22, 23 and 24 are formed by coil A3 of seven turns and a coil B3 of eight turns, by coil A4 of eight turns and a coil B4 of seven turns, and by a coil A5 of seven turns and a coil B5 of eight turns, respectively, which are connected in series.

Specifically, as shown in FIG. 4 the coil A1 (of seven turns) of the armature winding 20 is installed in the slot between the teeth 37 and 38 and the slot between the teeth 34 and 35; the coil A2 (of eight turns) of the armature winding 21 is installed in the slot between the teeth 38 and 39 and the slot between the teeth 35 and 36; the coil A3 (of seven turns) of the armature winding 22 is installed in the slot between the teeth 39 and 30 and the slot between the teeth 36 and 37; the coil A4 (of eight turns) of the armature winding 23 is installed in the slot between the teeth 30 and 31 and the slot between the teeth 37 and 38; and the coil A5 (of seven turns) of the armature winding 24 is installed in the slot between the teeth 31 and 32 and the slot between the teeth 38 and 39.

Further, the coil B1 (of eight turns) of the armature winding 20 is installed in the slot between the teeth 32 and 33 and the slot between the teeth 39 and 30; the coil B2 (of seven turns) of the armature winding 21 is installed in the slot between the teeth 33 and 34 and the slot between the teeth 30 and 31; the coil B3 (of eight turns) of the armature winding 22 is installed in the slot between the teeth 34 and 35 and the slot between the teeth 31 and 32; and the coil B4 (of seven turns) of the armature winding 23 is installed in the slot between the teeth 35 and 36 and the slot between the teeth 32 and 33; and the coil B5 (of eight turns) of the armature winding 24 is installed in the slot between the teeth 36 and 37 and the slot between the teeth 33 and 34. The armature windings 22 to 24 are not illustrated in FIG. 4, and only the reference marks of the coils are indicated together with the number of turns.

Therefore, as for the coils A (coils A1 to A5) which form the respective armature windings, the coils A1 to A5 of which numbers of turns are 7, 8, 7, 8, 7, respectively, are arranged in this order in the circumferential direction (in the direction of reverse rotation shown in FIGS. 3 and 4, in this embodiment) .As for the coils B (coils B1 to B5) which also form the respective armature windings, the coils A1 to A5 of which numbers of turns are 8, 7, 8, 7, 8, respectively, are arranged in this order in the circumferential direction (in the direction of the reverse rotation shown in FIGS. 3 and 4, in this embodiment). Therefore, when the armature windings 20 to 24 are thus formed by winding the wire, as shown in FIG. 4, a wire of fifteen turns (15=7+8) is installed within each slot.

The "coils A1 to A5" and "coil B1 to B5" in this embodiment correspond to the "coils" in this invention. The coils A (coils A1 to A5) and coils B (coils B1 to B5) in this embodiment correspond to the "first coil" and the "second coil", respectively, in this invention.

As for the armature windings 20, 21, as shown in FIG. 3, the driving current to the driving motor flows from the brush 145a connected to the positive electrode of the power to the brush 145b connected to the negative electrode of the power, via the segment 40, the coil A1 of the armature winding 20, the coil B1 of the armature winding 20, the segment 46, the segment 41, the coil A2 of the armature winding 21, coil B2 of the armature winding 21, the segment 47 and the segment 42, in this order.

By the passage of current through the armature windings, a magnetic field is generated around the coils A1, A2, B1, B2 and interacts with the field generated by the magnetic ring of the stator 135. As a result, the armature 133 is caused to rotate clockwise as viewed in FIG. 4 (leftward as viewed in FIG. 3).

Actually, the armature windings 20 to 24 are provided between the segments. When the armature 133 rotates, the segments of the commutator 137 keep moving into sliding contact with the brushes 145a, 145b in ascending order of reference numerals of the segments shown in FIGS. 3 and 4 (40-41- . . . -49-40 . . . ). Therefore, the armature 133 keeps rotating clockwise as viewed in FIG. 4 while the commutator 137 and brushes 145a, 145b commutate the driving current passing through the armature windings.

In the case of reverse rotation, the brush 145b is connected to the positive electrode of the power and the brush 145a is connected to the negative electrode power. Thus, the armature 133 keeps rotating counterclockwise as viewed in FIG. 4.

With the impact driver 100 according to this embodiment, the total number of turns of each of the armature windings 20 to 24 between the associated segments, or the total number of turns of the coil A and the coil B (e.g. the coil A1 and the coil B1, or the coil A2 and the coil B2) is the same (fifteen in this embodiment) as that of the other armature windings. However, in the same armature winding, one coil can have a different number of turns from the others. In this embodiment, each of the armature windings has two coils, the coil A and the coil B, one of which consists of seven turns while the other of eight turns.

Thus, the armature windings connected between the segments adjacent to the commutator consist of the same number of turns. Therefore, the magnetic field generated around each of the armature windings when the driving current passes through the armature windings do not easily vary in strength. As a result, in the driving motor of the power tool of this embodiment, the commutator is not easily deteriorated and can readily keep high commutating performance. Further, fine adjustment of the numbers of turns of the armature windings can be easily made. For example, if all the coils consist of eight turns, which means that the total number of turns of the armature windings is sixteen, the torque output characteristic may be too high. However, if all the coils consist of seven turns, which means that the total number of turns of the armature windings is fourteen, the torque output characteristic may be too low. In such case, fine adjustment can be made such that the total numbers of turns of the armature windings is fifteen like in this embodiment. Thus, the output characteristic of the motor of the power tool can be easily adjusted to any desired level.

Further, according to the impact driver 100, the number of the wires of the coils installed in each of the slots of the armature 133 is the same (fifteen in this embodiment) as that of the wires in the other slots. Therefore, imbalance in the number of turns of the wire is not substantially increased in the circumferential direction of the armature 133 on which the armature windings 20 to 24 are wound. As a result, application of excessive load to the output shaft 122 of the motor 121 can be prevented. Thus, stable operation of the motor can be realized.

The present invention is not limited to the constructions as described above, but rather, may be added to, changed, replaced with alternatives or otherwise modified.

In the above embodiment, the driving motor is describe as a four-pole two-brush DC motor, but the numbers of poles and brushes are not limited to this. For example, the motor may be of six-pole two-brush type. In such a case, each of the armature windings consists of three coils connected in series, and the numbers of turns of the three coils may be selected, for example, to be (7, 7, 8), (8, 7, 7), (7, 8, 7), (7, 7, 8) for the respective armature windings. Further, while defining each armature winding with a plurality of coils connected in series, the number of turns of each coil within each armature winding may be randomized as long as the total number of turns of the coils of each of the armature windings is the same with the other armature windings.

Further, in this embodiment, the wire of the coils is installed by distributed winding. However, the same effect as this embodiment can also be obtained by concentrated winding.

DESCRIPTION OF NUMERALS 20, 21, 22, 23, 24 armature winding
100 impact driver (power tool)
101 body
103 motor housing
105 gear housing
107 handgrip
109 driver bit (tool bit)
111 speed reducing mechanism
112 spindle
113 ball
114 hammer
115 anvil
116 compression spring
121 driving motor
122 output shaft
123, 124 bearing
125 trigger
127 battery
133 armature
135 stator
137 commutator
145a, 145b brush
A1, A2, A3, A4, A5 coil
B1, B2, B3, B4, B5 coil

What is claimed is:

1. A power tool comprising:
a tool bit that performs a predetermined operation and
a motor to drive the tool bit, wherein the motor includes an armature having a plurality of slots, a four-pole stator, a commutator that rotates together with the armature, two brushes spaced 90° apart from each other in the direction of sliding contact with the commutator, a plurality of segments provided on the commutator, and a plurality of armature windings, both ends of each winding being connected to the segments, each of the armature windings being defined by coils that are wound between respective pairs of the slots of the armature and wherein each of the armature windings is formed by at least two coils connected in series, wherein:
at least one of the coils defining the armature windings has a different number of turns of a wire wound between the associated slots from the other coils in the same armature winding, and the total number of turns of the coils of each of the armature windings is the same,
each of the armature windings comprises a first coil and a second coil that are connected in series, the second coil being wound between the slots which are diametrically opposite in the armature with respect to the slots for the first coil, and
when one armature winding is connected between an associated pair of the segments and comprises the first coil of m turns and the second coil of n turns, another armature winding is connected between an associated pair of the segments adjacent to the pair of segments for the one armature winding and comprises the first coil of n turns and the second coil of m turns, the difference between m and n being an odd number.

2. The power tool according to claim 1, wherein the difference between m and n is one turn.

3. The power tool according to claim 1, wherein a ring magnet provided on the inside surface of the stator faces the armature.

* * * * *